W. DALTON.
ELASTIC BELT.
APPLICATION FILED MAY 22, 1908. RENEWED APR. 28, 1909.

924,324.

Patented June 8, 1909.

Witnesses:
E. A. Volk.
A. J. Dimond.

Inventor.
William Dalton
by Wilhelm, Parker & Hard,
Attorneys.

UNITED STATES PATENT OFFICE.

WILLIAM DALTON, OF BUFFALO, NEW YORK, ASSIGNOR TO CHARLES DALTON, OF LIMERICK, IRELAND.

ELASTIC BELT.

No. 924,324.   Specification of Letters Patent.   Patented June 8, 1909.

Application filed May 22, 1908, Serial No. 434,219. Renewed April 28, 1909. Serial No. 492,771.

*To all whom it may concern:*

Be it known that I, WILLIAM DALTON, a subject of the King of Great Britain, residing at Buffalo, in the county of Erie and State of New York, have invented a new and useful Improvement in Elastic Belts, of which the following is a specification.

This invention relates more particularly to improvements in elastic or extensible drive belts which are composed of close spring wire coils. Belts of this character are especially adapted for use upon dental engines for connecting the main drive wheel with the pulley on the flexible tool shaft, and for other small machines for transmitting power from one pulley to another where an elastic belt is desired.

The object of this invention is to construct a belt of this character in which the spring coil is inclosed by a covering which affords a better frictional surface so as to increase the tractive power of the belt, and which also protects the spring coil from wear and reduces to a minimum the noise caused by the direct contact of the metal coil with the pulleys.

Figure 1:
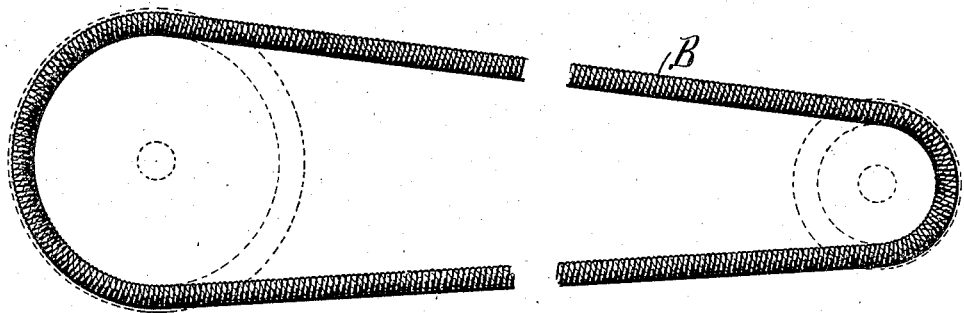
Figure 2:
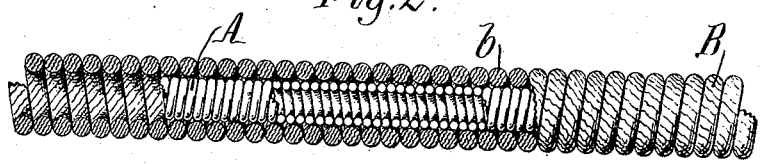
Figure 3:

In the accompanying drawings: Figure 1 is an elevation of a belt embodying the invention. Fig. 2 is a sectional elevation thereof on an enlarged scale. Fig. 3 is a cross-section thereof, on an enlarged scale.

Like letters of reference refer to like parts in the several figures.

A represents a closely wound helix or coil of spring wire which may be of any suitable cross-sectional shape, the size of the wire and the diameter of the coil being dependent upon the desired size and strength of the belt, but the construction is especially suitable for belts of relatively small diameters.

B represents a covering which surrounds the spring coil A and consists of a flexible cord *b* of any strong and durable material which is wound closely about the spring coil, preferably in the same direction as the wire of the spring coil. The covering cord *b* is preferably of sufficiently greater size than the wire of which the spring coil is formed, so that it cannot work in between the convolutions of the spring coil when these are separated under tension. The covering B thus closely surrounds the spring coil A throughout its entire length. It is as flexible as the spring coil and, by reason of the helical windings of which it is composed, it is free to elongate with the spring coil and thus does not interfere with the stretching thereof. This covering is prevented from slipping on the spring coil by reason of the uneven surface of the coil due to the helical form of the same. The windings of the covering form a rough outer surface which engages the pulleys and increases the frictional contact of the belt therewith. The wear on the belt is received by this covering and when the latter becomes worn, it may be readily removed and the coil rewound. The covering also serves to eliminate the objectional buzzing noise which results when the coiled wire belt is used without any covering.

I claim as my invention:

1. An elastic belt comprising an elastic core, and a covering therefor consisting of a flexible non-metallic cord wound helically about the same, substantially as set forth.

2. An elastic belt comprising a spring coil, and a covering therefor consisting of a flexible non-metallic cord wound helically about said spring coil, substantially as set forth.

3. An elastic belt comprising a spring coil, and a covering therefor consisting of a flexible non-metallic cord wound helically about said spring coil in the same direction as the convolutions of said coil, substantially as set forth.

4. An elastic belt comprising a spring wire coil, and a covering therefor consisting of a flexible cord of greater size than the wire of said spring coil, which is wound helically about said coil, substantially as set forth.

Witness my hand, this 9th day of May, 1908.

WILLIAM DALTON.

Witnesses:
E. C. HARD,
C. B. HORNBECK.